Aug. 11, 1925.  1,549,633
A. W. UZEMACK
CUTTING ATTACHMENT FOR CULTIVATORS
Filed Feb. 27, 1925
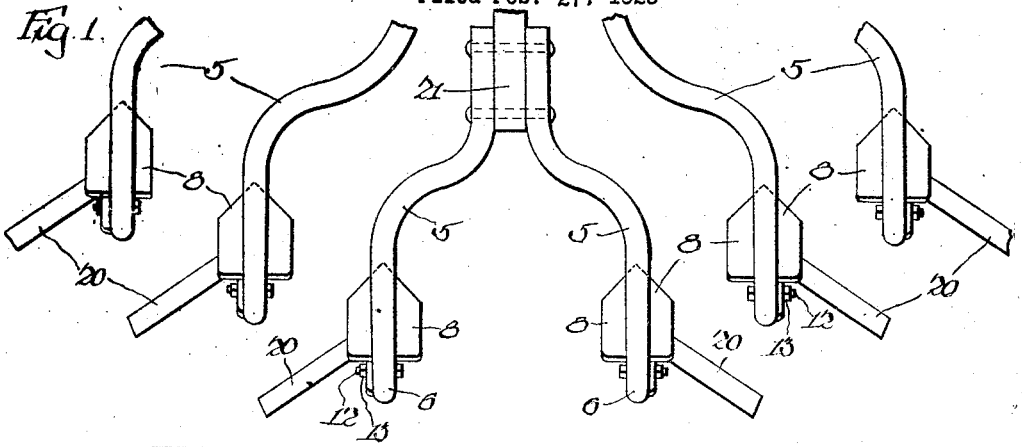
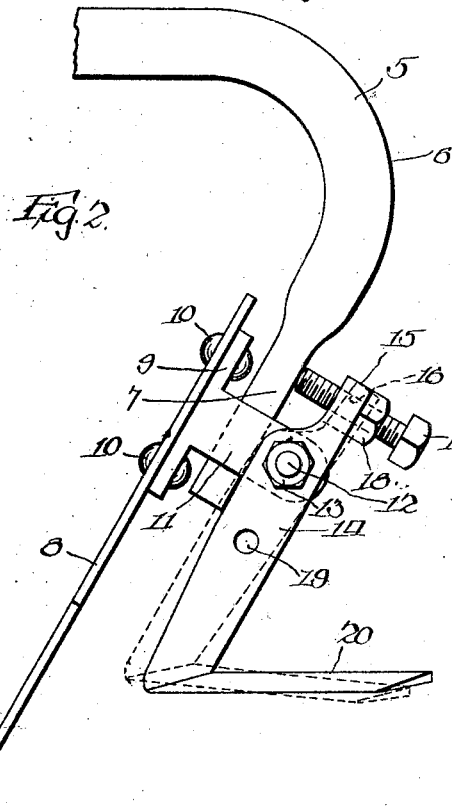
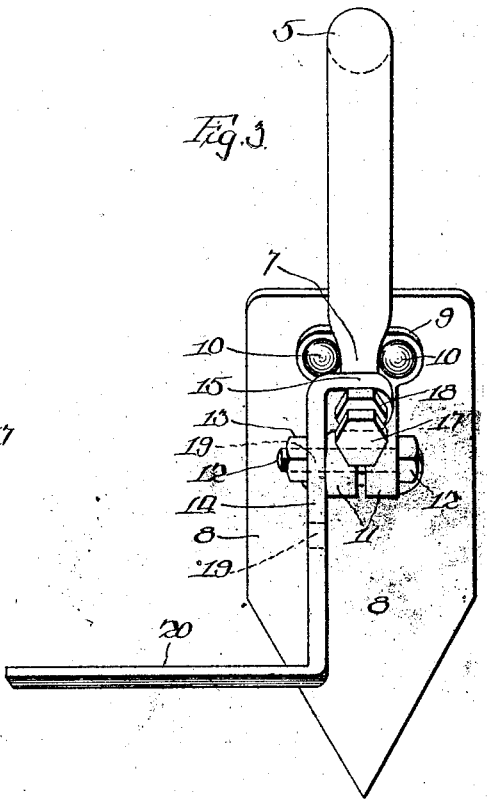
Inventor
Alexander W. Uzemack
By Chas. E. Tillman
Atty Patented Aug. 11, 1925.

1,549,633

UNITED STATES PATENT OFFICE.

ALEXANDER W. UZEMACK, OF TINLEY PARK, ILLINOIS.

CUTTING ATTACHMENT FOR CULTIVATORS.

Application filed February 27, 1925. Serial No. 12,136.

*To all whom it may concern:*

Be it known that I, ALEXANDER W. UZEMACK, a citizen of the Republic of Lithuania, residing at Tinley Park, in the county of Cook and State of Illinois, have invented certain new and useful Improvements in Cutting Attachments for Cultivators, of which the following is a specification.

This invention relates, generally, to improvements in farm implements, but has particular relation to an attachment for cultivators and especially that type thereof employed for the cultivation of corn, and it consists in certain peculiarities of the construction, novel arrangement and combination of its parts as will be hereinafter more fully set forth and specifically claimed.

The principal object of the invention is to provide an attachment to be supported and used rearwardly of each of the shares or hoes of the cultivator and at one side of each thereof, for the purpose of cutting roots, weeds, grass, and other vegetation growing between the rows of the plants being cultivated, which shall be simple and inexpensive in construction, strong, durable, and efficient in operation, and which can be readily attached to or removed from a supporting part of the cultivator.

Another object of the invention is the provision of means whereby the attachment can be readily adjusted vertically with respect to its support, as well as to the surface of the ground, thereby enabling it to operate at a greater or less point thereunder, or thereabove if desired.

Still another object is the provision of means for regulating and maintaining the angle or pitch of the blade of the attachment with respect to the share or hoe of the cultivator with which it is directly associated, as well as with respect to the plane in which it travels, so as to increase its cutting efficiency.

Other objects and advantages of the invention will be disclosed in the following description and explanation.

In the accompanying drawing, which serves to illustrate an embodiment of the invention, Fig. 1 is a fragmental plan view of the rear portion of a cultivator, showing the share supporting shanks arranged in gang formation and illustrating an attachment embodying the invention mounted on each of said shanks.

Fig. 2 is an enlarged view in side elevation of one of the shanks of the cultivator showing a hoe or share mounted thereon and equipped with one of the attachments, and Fig. 3 is a rear view in elevation thereof.

Like numerals of reference refer to like parts throughout the different views of the drawings.

The reference numeral 5 designates the shanks of the cultivator, which shanks may be of the well known or ordinary construction and mounted in the well known way on the frame, not shown, and pole or tongue of the cultivator, as usual. Each of the shanks 5 is provided at its rear portion with a downwardly extended curved part 6 which terminates at its lower extremity in a forwardly and downwardly inclined portion 7, which portion is preferably rectangular in cross-section for more thorough co-operation with certain clamping and contacting parts therewith as will be presently explained. Each of the shares or hoes 8 of the cultivator is provided on its upper rear surface with a plate 9 which is secured to the share or hoe 8 by means of rivets or bolts 10 and has extended rearwardly therefrom a pair of clamping arms 11 which are transversely apertured near their free ends and are spaced apart to enable a shank 7 to be inserted there-between in such a way that one of the arms 11 will lie on or against each of the sides of the beam or portion 7 of the shank while the openings in said arms near their free ends will be located in register with one another rearwardly of the rear flat surface of the portion 7 as is clearly shown in Fig. 2 of the drawing. A bolt 12 is extended through the openings in said arms and said arms can be tightly clamped against the sides of the portion 7 by means of a nut 13 screwed up on the threaded portion of said bolt.

My attachment comprises an upright arm 14 by preference in the form of a flattened bar having at its upper end a laterally extended arm 15 provided with a transversely disposed opening 16 for the reception and operation of an adjusting screw 17 which has mounted thereon between its head and the arm 15 a lock nut 18 to be used for maintaining the screw 17 in desired position after the same has been adjusted. The upright arm 14 is provided with a plurality of spaced openings 19 arranged one above the other, in one of which the bolt 12 may be placed for supporting the attachment. At its lower end the upright arm 14 is provided with a horizontally and rearwardly disposed blade 20 which is formed with a forwardly presented knife edge as is clearly shown in Fig. 2 of the drawing. This blade 20 is not only rearwardly inclined from the arm 14 at the lower portion thereof but is so positioned with respect thereto as to present its surfaces at different angles with respect to the shares 8 as well as with respect to the surface of the ground when the attachment is properly adjusted on its mount. This adjustment can be done through the instrumentality of the adjusting screw 17 which it will be understood rests at one of its ends against the rear surface of the portion 7 of the shank C, so that by turning the screw 17 in one direction, for instance to the right, the position of the attachment can be changed from that shown by continuous lines to that of the dotted line position shown in Fig. 2 of the drawing, in which latter position it is obvious the cutting edge of the blade 20 will be slightly elevated. After the arm 14 has been suitably adjusted, the lock nut 18 can be positioned on the screw 17 so as to rest against the rear surface of the upper part of the arm 14 and thus maintain the attachment in its proper or adjusted position. If it is desired to position the cutting blade 20 so that the same may operate at a greater or less depth under the surface of the ground, it is obvious that the openings 19 in the bar 14 will permit of the bolt 12 being placed in either of the openings 19 after which it is manifest the arm 14 can be securely held in position on the bolt 12 by screwing up the nut 13 on said bolt.

From the foregoing and by reference to the drawing, it will be readily understood and clearly seen that, assuming that the parts of the cultivator and the attachment are arranged as shown in Fig. 1 of the drawings and that the movement of the cultivator is in the direction of the top of the sheet of drawing, and that the pair of shanks 5 and their shares 8 attached to a portion of the tongue 21, as shown, stride the row of corn to be cultivated, it is manifest that the shares and the attachments on each side of said row of corn will be disposed so as to plow up the spaces between the row which the middle pair of shanks stride and the adjacent row on each side thereof, and that in this operation the blades 20 will be caused to move in the direction of their knife edges under the surface of the ground, thus causing the roots or vegetation to be severed. The depth of the blades with respect to the surface of the ground can be effected in two ways. That is, by moving the shares and the clamps which they carry in the proper direction on the portion 7 of the shanks 5 and setting them in the proper position by tightening up the nuts 13 on the bolts 12, or the arm 14 of the attachment can be changed so that the bolt 12 can be fitted in an upper or lower opening 19 thereof, as is obvious.

Having thus fully described my invention, what I claim as new and desire to secure by Letters Patent is:

The combination with the downwardly and forwardly extended portion of a shank of a cultivator, of a share having on its rear portion a pair of spaced clamping members striding said portion of the shank, means to clamp said members in position, said means having a screw-threaded portion extended laterally through one of said members, an angular or elbow-shaped member providing an upright arm and a horizontally disposed and longitudinally rearwardly inclined blade, said arm having at its upper portion a laterally extended apertured offset portion and below said portion a transverse opening receiving the screw-threaded portion of the means for clamping said clamping members together, and a screw adjustably mounted in the aperture of said offset portion.

ALEXANDER W. UZEMACK.